United States Patent [19]

Kabilka et al.

[11] 4,108,329

[45] Aug. 22, 1978

[54] FLAT HIGH PRESSURE CONTAINER

[75] Inventors: Otto Kabilka; Thilo Schulz, both of Putzbrunn, Fed. Rep. of Germany

[73] Assignee: Messerschmitt-Boelkow-Blohm GmbH, Munich, Fed. Rep. of Germany

[21] Appl. No.: 747,544

[22] Filed: Dec. 6, 1976

[30] Foreign Application Priority Data

Dec. 11, 1975 [DE] Fed. Rep. of Germany ....... 2555727

[51] Int. Cl.² .................... B65D 25/18; B65D 7/42
[52] U.S. Cl. .................... 220/453; 220/444; 220/3; 220/83
[58] Field of Search ............ 220/9 R, 9 F, 9 M, 3, 220/15, 17, 83, 9 A, 85 B, 84, 83

[56] References Cited

U.S. PATENT DOCUMENTS

| 2,262,403 | 11/1941 | Pankow | 220/9 R |
| 3,401,817 | 9/1968 | Palson | 220/83 X |
| 3,416,692 | 12/1968 | Cline et al. | 220/9 F |

Primary Examiner—William Price
Assistant Examiner—Steven M. Pollard
Attorney, Agent, or Firm—W. G. Fasse; W. W. Roberts

[57] ABSTRACT

A container, especially a flat container suitable for confining high internal pressures includes inner membranes secured to lateral side frame members. The inner membranes have inwardly facing convex surfaces and bear against outer walls through hard foam filler material located in the spaces between the inner membranes and the outer walls. The membranes and the walls are manufactured by filament winding techniques.

14 Claims, 9 Drawing Figures

FLAT HIGH PRESSURE CONTAINER

BACKGROUND OF THE INVENTION

The invention relates to a flat high pressure container and a process for manufacturing such a container in the form of a hollow body.

Pressure containers for the storage and transport of gasses and liquids are well known, especially in the area of rocket technology. Such containers have pressure resistant walls made of metal or produced as so-called synthetic rovings made by filament winding techniques. The permeability of such wall components must be compensated. This is accomplished by a so-called liner which covers the inner surface of the container walls. In the manufacture of such hollow bodies, as a rule, a spherical or cylindrical shape is preferred and the containers are provided with hemispherical or ball shaped end pieces. Such shapes are preferred because they are well suited to compressive strength requirements. Flat, high pressure containers, or hollow bodies are not known in the art. However, for certain purposes, flat containers would be preferably, for example, to save space or to accomodate items not suited for storage in substantially round containers.

OBJECTS OF THE INVENTION

In view of the above, it is the aim of the invention to achieve the following objects, singly or in combination:

to provide a flat hollow body or container suitable for loading by high internal pressures and which may be used for receiving, for example, a gas filled insert core having a rectangular configuration or cross-section;

to construct a flat hollow body or container in such a manner that it will not change its geometrical shape even under substantial increases in the internal pressure;

to adapt filament winding techniques to the production of flat hollow container bodies;

to construct flat hollow high pressure containers in such a manner that the expansion rigidity or elasticity of the material is utilized to the fullest possible extent; and to minimize deformations of the container by limiting or compensating the deformations in the direction of the thickness of the container walls as well as in the longitudinal and lateral direction of the container walls.

SUMMARY OF THE INVENTION

According to the invention there is provided a flat high pressure container, wherein the expansion deformation of inner wall forming membranes is limited by outer support means in force transmitting contact with the inner membranes. In a preferred embodiment the force transmitting contact between the inner membranes and the outer support means is accomplished by a supporting filler material, for example, a blown in hard foam material.

The invention is based on the discovery that an optimal dimensional stability of flat hollow bodies or containers subject to high internal pressures may be achieved only if the expansion rigidity or elasticity strength of the material is fully utilized. The deformation of a pressure membrane in the direction of its thickness and its deformation in its longitudinal direction is minimized or compensated by suitable filling means between the membrane and an outer supporting wall. Similarly the deformation in the longitudinal and lateral direction is also minimized by suitable supporting means such as frame members.

The invention also relates to an method for the production of flat hollow bodies or containers subject to internal pressures. Such containers are manufactured, according to the invention, by using synthetic material, such as filaments, fiber reinforced and used in a winding process. A special feature of the invention is seen in that at least two pre-fabricated membrane elements are held against lateral displacement in side frame members, whereby an insert core enclosed between the membrane forms a winding mandrel or a model for a winding mandrel for the production of an outer sheathing to form an outer anchor or an outer wall or membrane, whereby the reinforcing fibers are preferably of carbon.

BRIEF FIGURE DESCRIPTION

In order that the invention may be clearly understood, it will now be described, by way of example, with reference to the accompanying drawings shown in different scales, wherein.

DETAILED DESCRIPTION OF PREFERRED EXAMPLE EMBODIMENTS

Figure 1:
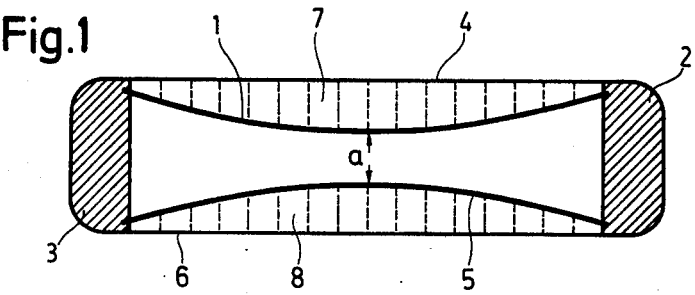
FIG. 1 is a sectional view through a container according to the invention with flat outer surfaces.

Referring to FIG. 1, the sectional view through a container according to the invention, illustrates membrane inner walls 1 and 5, the longitudinal edges of which are secured to side frame members 2 and 3, for example, in respective grooves of the side frame members which are made of strong flexurally rigid material, for example, metal. The inner walls or membranes 1 and 5 have a convex inwardly facing surface. The closest spacing between these surfaces is shown at "$a$". Anchor means forming outer side walls 4 and 6, rigidly interconnect the side frame members 2 and 3, thereby defining the lateral spacing of the side frame members 2 and 3 from each other. The pressure forces applied to the membranes 1 and 5 are taken up by the outer walls 4 and 6, and by the side frame members 2 and 3.

Figure 4:
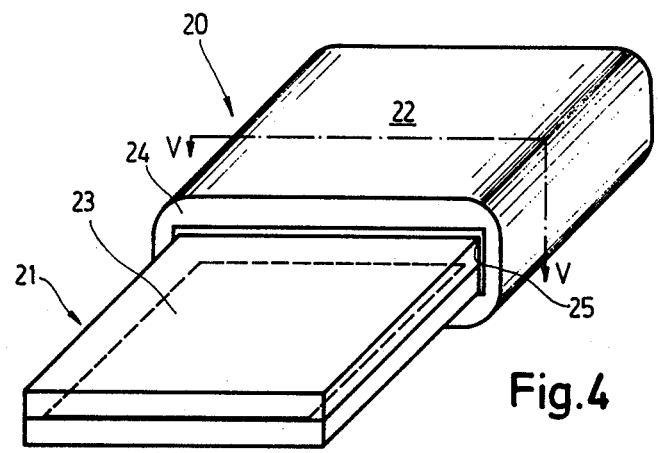
FIG. 4 is a perspective view of a hollow body or container according to the invention, into which an insert core has been partially inserted.

In the shown example of FIG. 1, the dimensions of the side frame members 2 and 3 are selected so that the above mentioned spacing "$a$" between the membranes 1 and 5 held by the side frame members, will correspond exactly to a spacing required for the insertion of a core such as an insert cassette 21 shown in FIG. 4.

The end faces of the hollow body may remain open, or they may be closed by similar membrane elements or by means of pressure resistant plates. Preferably, the spaces between the inner membranes 1 and 5 on the one hand, and the respective outer walls 4 and 6, there are provided force transmitting means, such as a supporting filler material 7 and 8. Such filler material may, for example, be a hard foam material which supports the membranes 1 and 5 and increases the break-down threshold or limit. Simultaneously, the filler material 7, 8 transmits the compressive forces resulting from the insertion of a cassette into the space between the membranes 1 and 5, to the outer anchoring walls 4 and 6.

Figure 2:
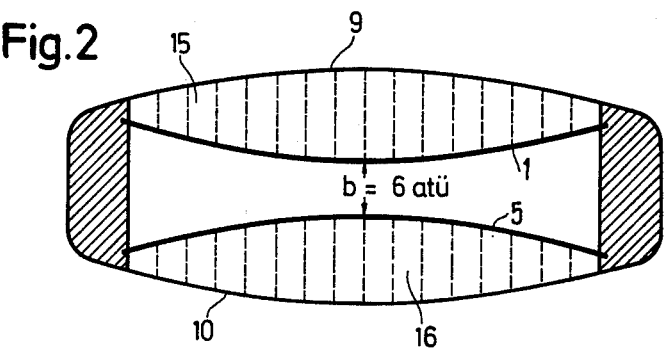
FIG. 2 shows a sectional view similar to that of FIG. 1, but illustrating a container with convex outer surfaces.

The embodiment of FIG. 2 is similar to that of FIG. 1, except that instead of the flat outer walls 4 and 6 shown in FIG. 1, there are outer wall membranes 9 and 10, which have outwardly facing convex surfaces. The space between the inner and outer membranes is preferably filled with a hard foam material as shown at 15 and 16, respectively.

A compressive load inside the container causes a longitudinal deformation of the support means in both embodiments of FIG. 1 and FIG. 2. However, due to the mutual influence between the inner membranes and the outer support walls 4, 5 and 9, 10 and the frame means, a widening or outward stretching of the hollow body is substantially eliminated, whereby the spacing "a" in FIG. 1 or "b" in FIG. 2 remains substantially constant. Incidentally, the internal pressures may well be in excess of 6 atmospheres gauge pressure.

Figure 3:
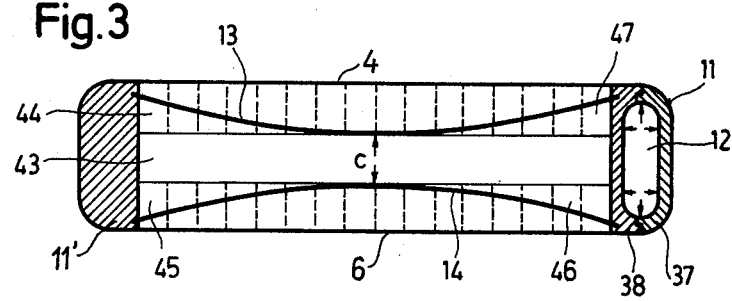
FIG. 3 is a view similar to that of FIG. 1, but showing a modification with a hollow side frame member into which a pressure medium may be admitted for the purpose of compensating internal pressures on the inner membranes.

The embodiment according to FIG. 3, is provided with a frame member 11 having a pressure cavity 12 therein, which may be connected to a source of hydraulic or pneumatic pressure to provide a counter force or pressure when an insert cassette 21 is pushed into the space "c" in the container. As the cassette 21 is inserted between the membranes 13 and 14, a pressure is transmitted to the frame member 11 and the counter pressure in the cavity 12, which is taken up by the outer walls 4, 6 and the opposite frame member 11', prevents a deformation of the hollow body or container. For this purpose, the frame member 11 is divided in the longitudinal direction into two sections 37 and 38. The section 38 holds the membranes 13 and 14 in position, because the pressure in the cavity 12 presses the section 38 to the left, whereby the membranes 13 and 14 are enabled to counteract any tendency of a longitudinal deformation of these membranes. Hence, the spacing "c" is maintained substantially constant.

FIG. 3 further illustrates the insertion of wedge-shaped filler elements 44, 45, 46, and 47 which may also be made of a hard foam material. These wedge-shaped elements take up the space inside the container adjacent to the membranes 13 and 14 as shown, whereby the slot 43 in the container is substantially rectangular and has the thickness "c".

FIG. 3 illustrates the use of the hollow body or container, according to the invention, as a holder or receptacle for a radiation sensitive foil or film 23 of a xeroradiographic device. Such devices are used, for example, in the production of X-ray photographs providing useful medical information. In such devices, a foil is electrostatically charged by the radiation and the charge is made visible by a staining. Since fiber reinforced synthetic materials, such as plastics, are transparent to X-rays, the entire container 20, as shown in FIG. 4 and the insert cassette 21 are made of plastics material which is partially fiber reinforced. Only the side frame elements, which are not visible in FIG. 4, would be made of metal. In FIG. 4 the outer wall 22 serving as an anchoring means is visible as an outer winding layer of the hollow body or container 20. A metal plate 24 closes the facing end, except for an insert opening 25 cut into the facing plate 24. The rear end of the container could also be closed by a metal plate. The cut-out opening 25 is dimensioned to receive the insert cassette 21.

Figure 5:
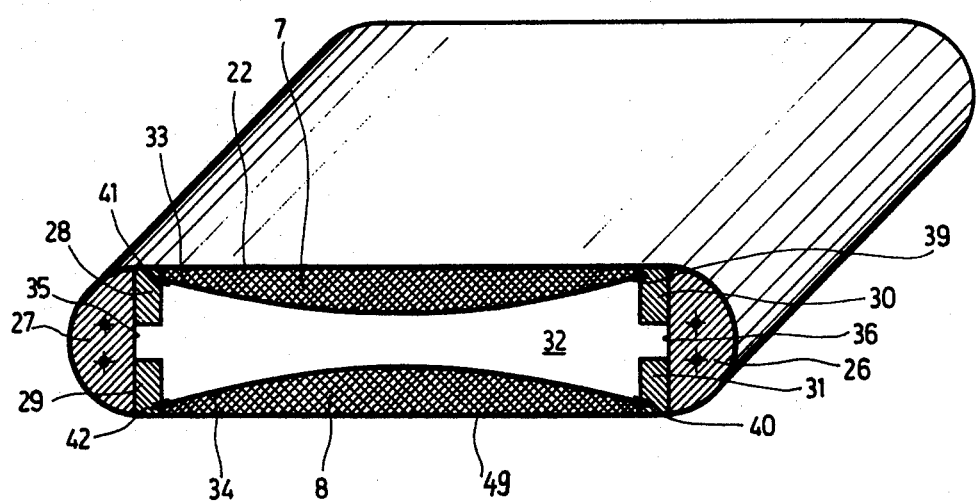
FIG. 5 is a sectional view along the line V — V of the hollow body according to FIG. 4.

FIG. 5 illustrates on a somewhat enlarged scale relative to FIGS. 1, 2, 4, a hollow body 20, wherein the frame members 26 and 27 have a substantially half-cylindrical surface facing outwardly. This facilitates the fabrication of the outer wall or anchor 22 and 49. The inwardly facing surfaces of the frame members 26, 27 which laterally confine the space 32 in the hollow container are provided with metal rods 28, 29, 30 and 31. These metal rods are vertically spaced from each other to provide guide grooves 35 and 36 for a cassette or the like to be inserted into the space 32. The cassette would be provided with a respective ridge or tongue riding in these grooves 35, 36. The metal rods are provided with grooves 39 to 42 which receive the longitudinal edges of the inner wall forming membranes 33, 34. The space between the inner membranes 33, 34 on the one hand, and the outer walls 22, 49 on the other hand, is again filled with force transmitting means, such as a hard foam material 7, 8 as shown in FIG. 1.

Figure 6:
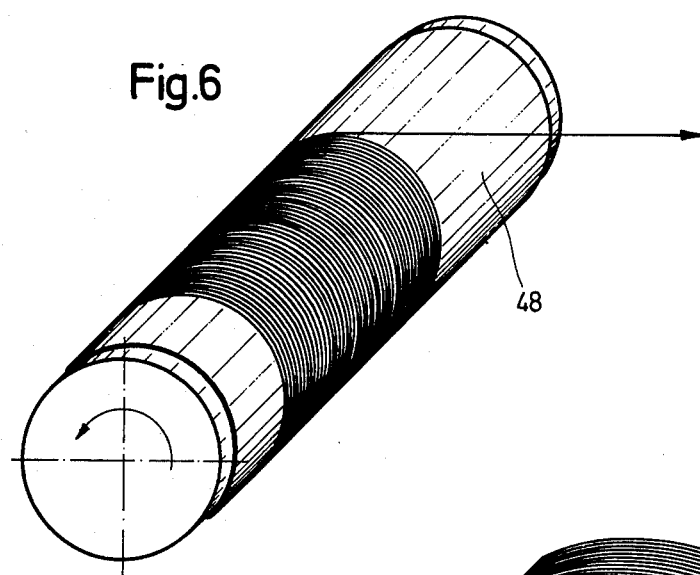
FIG. 6 illustrates the winding of a filament fiber onto a cylindrical core.

The process steps for manufacturing a hollow container, according to the invention, will now be described with reference to FIGS. 6 to 9. First, the inner membranes 33 and 34, for the embodiments of FIGS. 4 and 5, are manufactured by winding a resin impregnated fiber filament onto a cylindrical core or mandrel 48, as shown in FIG. 6. Preferably, the fiber filament is made of carbon fibers. If the winding pitch is small, the winding angle will be substantially 90°. The circumference of the mandrel 48 must be at least such that it corresponds to the desired length of the finished membrane which is cut from the filament winding after removal from the mandrel 48. FIG. 6 illustrates the well known filament winding method employing, as mentioned, resin impregnated substantially endless filaments which are wound onto the rotating mandrel 48.

Figure 7:
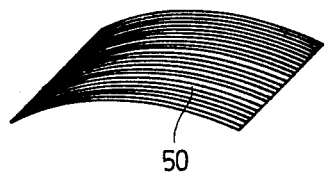
FIG. 7 illustrates a section of the wound fiber or filament material after impregnation with a resin and curing of the resin.

After substantially curing of the wound filament the winding is cut into membranes, in accordance with the dimensions required for such membranes, whereby a certain allowance is made for the subsequent final cutting. FIG. 7 illustrates a wound surface 50. After cutting the section 50 may be pressed into the desired shape in a special tool, whereupon it is fully cured. The pressing may be accomplished while the section 50 is still resting on the mandrel 48 or it may be accomplished after completely removing the section from the mandrel. The pressing and curing may take place in a vacuum.

The section layer 50 shown in FIG. 7 will then be cut again to the final longitudinal and width dimensions, whereby the radii of the curvature to which the membrane will be subjected in the container, are taken into account. Incidentally, the inner wall forming membranes may be manufactured in the same manner as just described.

Figure 8:
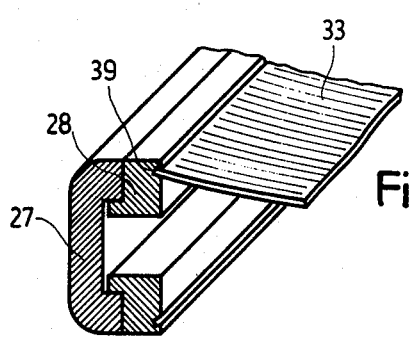
FIG. 8 illustrates a partial perspective view of an inner membrane secured to a side frame member.

FIG. 8 illustrates the insertion of a membrane 33 into the groove 39 provided in the rod 28 of the frame member 27 as shown in FIG. 5. The membranes may be secured in these grooves 29, for example, by an adhesive.[+] Prior to the securing, the edges of the membrane, as well as the edges of the grooves will be carefully sanded down to make them blunt to assure the proper insertion of the edges into their respective groove. Instead of using an adhesive for securing the membranes into the respective grooves, it is also possible to use wedging means or the like, for example, wedging means which are displaceable along the length of the respective groove.

+) An example for a suitable adhesive is known under the tradename "Analdit AV 138". This adhesive may be cured by means of an additive with HV 998. The adhesive and the curing addetive are sold by Ciba-Geigy.

As mentioned, the membranes which form the outer walls, such as 4 and 6 in FIG. 1, or 9 and 10 in FIG. 2 may also be produced by the filament winding technique, as will now be described in more detail with reference to FIG. 9. For this purpose, a cassette 21 is inserted into a structure such as partially shown in FIG. 8, for example, whereby the cassette 21 acts as the winding core or mandrel, whereupon the entire arrangement 51, as shown in FIG. 9 is used for the winding operation.

Where the outer wall or support elements are to have outwardly facing convex surfaces 9 and 10, as shown in FIG. 2, the filler material 15 or 16 is first applied prior to the winding operation and the filler material 15, 16 is shaped prior to its curing to provide the outwardly convex surfaces. This may be accomplished by applying, for example, in a jig or the like, horizontally inwardly directed pressure to the frame members when the filler material 15, 16 is applied.

Figure 9:
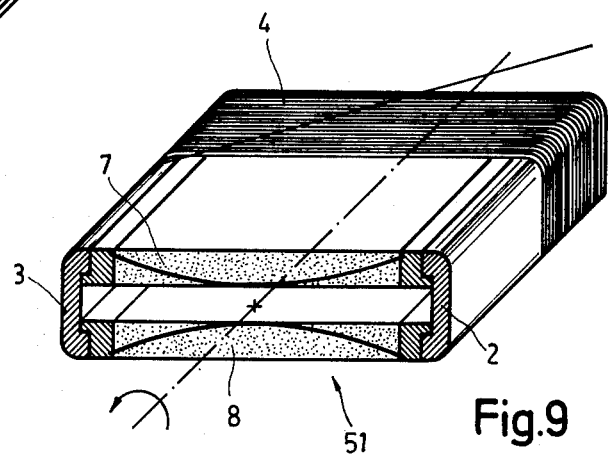
FIG. 9 illustrates a perspective view of the filament winding to form the outer walls of a hollow body or container according to the invention.

It will be appreciated that the winding operation illustrated in FIG. 9 may be applied prior to the insertion of the filler materials 7, 8, whereby flat outer surfaces will be accomplished or, as mentioned, the filler material may be provided prior to the winding where it is desired to make the container in the shape shown in FIG. 2. In any event, the mandrel may have a length corresponding to several times the length of the finished containers, whereby the outer walls or support means may be wound simultaneously for a plurality of containers. In this instance, the long winding or hose is then merely cut into pieces of suitable length for the individual containers. In this method it may be desirable to use a mandrel 48 and to insert the assembly into the finished winding portion which has been cut from a longer winding.

Although the invention has been described with reference to specific example embodiments, it will be appreciated, that it is intended to cover all modifications and equivalents within the scope of the appended claims.

What is claimed is:

1. A flat container having narrow sides and wide sides, especially suitable for confining high internal pressures, comprising side frame means rigid against bending and extending along said narrow sides, resin impregnated filament membrane means having longitudinal edges and inwardly facing convex surfaces means securing said longitudinal edges to said side frame means, said membrane means forming internal container walls, supporting external container wall means of resin impregnated filaments substantially surrounding the container and extending substantially coextensive with said membrane means, said supporting external container wall means being secured to said side frame means, and force transmitting means operatively arranged between said supporting external container wall means and said membrane means, whereby the external wall means take up forces resulting from any expansion deformation of said membrane means to minimize deformations of the container.

2. The container of claim 1, wherein said force transmitting means comprise a supporting filling in the space between each of said membrane means and the respective external container wall means.

3. The container of claim 2, wherein said supporting filling comprises a synthetic hard foam material.

4. The container of claim 1, wherein said securing means comprise longitudinal groove means in said side frame means, said longitudinal edges of said membrane means being held in said longitudinal groove means.

5. The container of claim 1, wherein said membrane means and said external container wall means are transparent or transmissive for X-rays.

6. The container according to claim 1, further comprising hard foam inserts having a wedge shape and located in the container proper in contact with said convex surfaces of said membrane means.

7. The container of claim 1, further comprising guide groove means extending alongside said side frame means inside the container proper.

8. A high pressure container, comprising resin impregnated filament membranes, frame means with grooves therein, each of said membranes being secured along opposite edges thereof in said grooves of said frame means, core means inserted between said filament membranes to form an inner structure, filament means wound around said inner structure to form external wall means, and force transmitting means inserted between said filament membranes and said external wall means.

9. The container of claim 8, comprising reinforcing fibers used in the production of said filament membranes and in the production of said external wall means.

10. The container of claim 9, wherein said reinforcing fibers are carbon fibers.

11. The container of claim 8, wherein said force transmitting means inserted between said filament membranes and said external wall means includes a synthetic foam material blown into the spaces between said filament membranes and said external wall means, and wherein said synthetic foam material is cured to form a hard foam body of high compressive strength.

12. The container of claim 8, wherein said filament membranes during the production of the container are subjected to an expansion forming by laterally displacing at least one of said frame means which fix the position of said filament membranes.

13. The container of claim 12, wherein said lateral displacing is accomplished by hydraulic or pneumatic pressure.

14. The container of claim 8, wherein said filament membranes are formed by winding the filaments on a core, impregnating the wound filaments with a resin, curing the resin and then cutting pieces of suitable size from the wound and cured structure.

* * * * *